United States Patent [19]

Birbara

[11] 4,324,819
[45] Apr. 13, 1982

[54] CATALYST FOR HYDRAZINE DECOMPOSITION AND THE METHOD OF PRODUCING THE CATALYST

[75] Inventor: Philip J. Birbara, Windsor Locks, Conn.

[73] Assignee: United Aircraft Corporation, Hartford, Conn.

[21] Appl. No.: 82,291

[22] Filed: Oct. 20, 1970

[51] Int. Cl.$^3$ .............................................. B05D 5/00
[52] U.S. Cl. ................................ 427/283; 427/443.1; 199/36; 264/3 E
[58] Field of Search ........................ 117/62, 123, 169; 60/218, 219, 220; 149/36; 252/460, 472; 264/3 E; 427/283, 430 R, 430 A

[56] References Cited

U.S. PATENT DOCUMENTS

| | | | |
|---|---|---|---|
| 3,366,705 | 1/1968 | Giannetti | 252/472 X |
| 3,608,313 | 9/1971 | Guth | 60/219 |
| 3,644,198 | 2/1972 | Wilhelm | 252/460 X |
| 3,660,310 | 5/1972 | Kluksdahl | 252/460 X |

*Primary Examiner*—Peter A. Nelson

*Attorney, Agent, or Firm*—Finnegan, Henderson, Farabow, Garrett & Dunner

[57] ABSTRACT

A catalyst is provided for decomposing hydrazine base monopropellants and providing multiple hydrazine-ignition restarts. The catalyst comprises a carrier material selected from the group consisting of high area ceramics, and ½ to 8% of active iridium, ruthenium, or mixtures thereof, based on the total weight of the catalyst. The active metal is deposited primarily on the exterior surface of the carrier. A second metal catalyst can be contained primarily within the interior of the carrier.

The method of producing the catalyst comprises impregnating the carrier with an alcohol solution containing a salt of iridium, ruthenium, or a mixture thereof, to deposit the metal on the exterior surface only of the carrier. The precious metal is reduced to an active pure metal by contact with a fluid reducing agent selected from the group consisting of hydrogen and hydrogen-inert gas mixtures. A second metal catalyst can be deposited uniformly throughout the catalyst by impregnating the carrier with an aqueous solution containing a compound of the second metal catalyst.

25 Claims, No Drawings

CATALYST FOR HYDRAZINE DECOMPOSITION AND THE METHOD OF PRODUCING THE CATALYST

This invention relates to a method of preparing a catalytic material for the decomposition of hydrazine-base monopropellants and to the products produced by this process. More particularly, this invention relates to a method of preparing catalysts having the ability to initiate the spontaneous exothermic thermal decomposition reaction of hydrazine-base monopropellants and to restart this decomposition reaction after an initial flow of the propellants has ceased and the temperature of the combustion chamber, where the reaction occurs, has fallen below the temperature at which the reaction is self-sustaining.

The catalysts of this invention are designed to be used in applications where it is necessary to initiate the decomposition reaction at moderately low temperatures or where a quick initial response to the flow of the monopropellant is not required. Further, the catalysts of this invention are true or spontaneous catalysts that exhibit their catalytic effects with no chemical change taking place in the catalyst itself during the decomposition reaction.

It is well known in the art that hydrazine and its derivatives possess utility as monopropellants for use in rocket engines and other applications where the generation of large quantities of gas is desirable.

These monopropellants can be thermally decomposed to generate large quantities of gas in a combustion chamber having an inlet through which the monopropellant is fed and an outlet for exhausting the gases produced by the decomposition reaction.

As used in this specification and claims, the term "monopropellant" refers either to a pure compound or to a homogeneous mixture (or solution) of compounds in the liquid state which can be made to decompose exothermally. So defined, the hydrazine-base monopropellants that can be decomposed by the catalysts of this invention include pure or 100% hydrazine, symmetrical dimethyl hydrazine, unsymmetrical dimethyl hydrazine, monomethyl hydrazine, mixtures of hydrazine with unsymmetrical dimethyl hydrazine and/or monomethyl hydrazine, and other mixtures containing hydrazine and/or its derivatives. As used herein, the term "hydrazine-base monopropellants" thus refers to monopropellants containing hydrazine and/or its derivatives.

The exothermic decomposition reaction of hydrazine becomes self-sustaining when the temperature of the reaction reaches approximately 450° F. The temperature at which the exothermic decomposition reaction of a monopropellant becomes self-sustaining is hereafter referred to as the "auto-decomposition temperature." Thus, if the thermal decomposition reaction can be initiated and if the temperature of the reaction can be raised to above 450° F., the reaction will generate enough heat to initiate and sustain the decomposition reaction of additional monopropellant as it is subsequently fed into the combustion chamber.

In the past, a number of methods have been used to initiate the exothermic decomposition reaction of hydrazine-base monopropellants. For example, hydrazine has been combined with liquid oxidizers such as nitric acid and hydrogen peroxide in two component reactions. With such oxidizers, hydrazine exhibits excellent self-igniting characteristics in which the oxidizers and hydrazine ignite spontaneously on contact with each other to initiate and sustain the thermal decomposition reaction. This self-ignition reaction is known as a hypergolic reaction. A hypergolic reaction is generally defined as a chemical reaction between two compounds which occurs spontaneously at some defined temperature, usually at ambient or room temperature of about 70° F.

Hydrazine-base monopropellants have also been used in systems where the monopropellant is the sole reactant. In these systems, the monopropellant is decomposed in the presence of selected catalysts. In such systems, the heat of the decomposition of the monopropellant is sufficient to sustain the decomposition reaction once decomposition is obtained, but subsequent initiation of the reaction presents special problems.

In the past, a number of methods have been utilized to initiate the decomposition of hydrazine-base monopropellants in a combustion chamber having a catalyst bed. Initial attempts to start the decomposition reaction were directed to heating the catalyst bed to a temperature sufficient to initiate the decomposition. The heating of the bed has been accomplished by various methods which include using electrical heaters, various glow plug devices, and electric sparks. Also, oxidizers which are hypergolic with hydrazine-base monopropellants have been injected during the start-up solely for the purpose of heating up the catalyst bed by the resulting combustion.

The main disadvantage of these prior art ignition systems is that they require auxiliary equipment which undesirably adds weight and complexity to the starter system. These auxiliary ignition devices also add additional cost to the system and further detract from the thrust obtainable from such systems by displacing needed area. The prior art has therefore sought to eliminate these auxiliary ignition systems and to this end catalysts have been developed that hypergolically react with hydrazine-base monopropellants to initiate thermal decomposition.

These hypergolic catalysts usually comprise a substrate having an oxidizer coated thereon which hypergolically reacts with the monopropellant in a vigorous oxidation-reduction reaction. The energy released from this reaction serves to heat the catalyst bed to a temperature sufficient to decompose the monopropellant. Once decomposition has been initiated, the heat of decomposition maintains the catalyst at a temperature sufficient to sustain the decomposition.

These systems are effective for maintaining the decomposition reaction of hydrazine-base monopropellants as long as the flow of the monopropellant is continuous and the temperature of the reaction chamber is kept above the auto-decomposition temperature of the monopropellant. Once the flow of monopropellant is terminated, however, and the temperature of the combustion chamber falls below the auto-decomposition temperature of the hydrazine-base monopropellant, the decomposition reaction cannot be restarted by introducing monopropellant, because the oxidizer on the catalyst has been depleted. This type of system is, nevertheless, satisfactory for many applications where only a single start is needed.

In other applications, however, it would be desirable to provide a multi-start system where even though an initial flow of the monopropellant is terminated and the temperature of the system is below the auto-decomposition temperature of the monopropellant, the flow can be started again, and a self-sustaining decomposition of the hydrazine-base monopropellant will occur. Such a system would, for example, be useful in the raising of sunken parts of ships and instrument packages by utilizing the gas generated during the decomposition, in the driving of a portable air compressor by the gas that is rapidly generated during the decomposition, and in the rapid inflating of escape chutes for aircraft by the gas that is generated during the decomposition.

Multi-start systems would also be useful in rocket engines that are used to power air and space-borne vehicles and would be particularly useful in missiles and rockets where numerous mid-course corrections are often necessary. In such applications the system must be capable of recommencing the self-decomposition of hydrazine-base monopropellants at any given time.

More recently, a catalyst has been developed for spontaneously decomposing hydrazine-base monopropellants at temperatures as low as −60° F. This catalyst consists of an alumina substrate impregnated with a large percentage of iridium throughout its structure and usually contains about 34% by weight of iridium. Although this catalyst exhibits multiple restart characteristics, its use in any application where large volumes of the catalyst would be required is not feasible from a commercial standpoint or from an availability standpoint.

Iridium is a rare, expensive and highly strategic material. Iridium is mined in South Africa and Canada, but due to its scarcity, these countries impose strict export controls on iridium, and the total amount of iridum entering the United States per year is small. Iridium is worth about $200 per ounce and catalysts containing 34% of this iridium cost approximately $2,500 per pound. It is therefore, desirable to provide a catalyst for spontaneously decomposing hydrazine-base monopropellants that possess a low concentration of iridium or no iridium at all.

Although it would be desirable to use catalysts having no iridium concentration at all, iridium is the most effective material now known for initiating, sustaining and restarting the thermal decomposition reaction of hydrazine-base monopropellants. Therefore, catalysts comprised of even small amounts of iridium have been found to be more effective than catalysts having no iridium concentration. For example, the performance characteristics of catalysts comprised mainly of molybdenum and lower oxides of molybdenum as the active catalytic material have been improved by the addition of as little as four percent iridium distributed uniformly throughout their structure. The iridium has been applied to these catalysts by impregnating the catalyst with an aqueous solution containing a dissolved salt of iridium, and reducing the salt to the active iridium metal.

The performance characteristics of prior catalysts containing low concentrations of iridium are not, however, comparable to the overall performance characteristics obtainable from catalysts using high iridium concentrations of approximately 34 percent by weight. Attempts to produce catalysts containing low concentrations of iridium and having performance characteristics which more favorably compare with the catalysts containing high percentages of iridium have heretofore not been successful.

Ruthenium is the second most effective catalyst now known for initiating, sustaining, and restarting the thermal decomposition reaction of hydrazine-base monopropellants. As with iridium, small amounts of ruthenium have been deposited uniformly throughout the structure of catalysts containing molybdenum as the active ingredient, and this addition has increased the performance characteristics of these catalysts. The ruthenium addition has been achieved from aqueous solutions containing a salt of ruthenium. Although these additions have improved the performance characteristics of the catalyst, they have not provided catalysts that approach the performance characteristics of catalysts containing large concentrations of ruthenium.

Catalytic activity of catalysts is believed to occur primarily at the exterior surface of the catalyst where the active catalytic material is deposited. Active catalytic material contained within the interior structure of the catalyst is not believed to substantially contribute to the catalytic effectiveness of the catalyst. Thus, it has been theorized that if active catalytic material can be primarily deposited on the exterior surface only or within a small distance of the exterior surface, smaller quantities of the catalytic material will be equally as effective in promoting catalytic activity as larger amounts of active catalytic material deposited uniformly throughout the structure of the catalyst.

In the past there have been attempts to concentrate active iridium or ruthenium as a catalytic material on the exterior surface only, or within a small distance of the exterior surface of carrier particles, but these attempts have proved unsuccessful. For example, aqueous solutions containing salts of iridium and ruthenium have been used to impregnate carrier particles, but these solutions have resulted in nearly uniform distribution of the salt throughout the carrier structure. Also, the carrier particles have been saturated or have been impregnated with an aqueous aluminum chloride solution before impregnation with the aqueous salt solution of iridum or ruthenium. These procedures for concentrating iridium or ruthenium on the exterior surface of the carrier have also proved unsuccessful.

Accordingly, it is a primary object of this invention to provide catalysts and a method for producing catalysts for decomposing hydrazine-base monopropellants which have a multiple restart capability.

Other objects of this invention are to provide a pre-stabilized catalyst and a method for producing a pre-stabilized catalyst for decomposing hydrazine-base monopropellants: (1) which has a low quantity of iridium or ruthenium; (2) which has a low quantity of iridium, ruthenium or mixtures of both deposited on the exterior surface only of the catalyst: (3) which has a long life and exhibits uniform catalytic activity throughout the life of the catalyst; (4) which is low in cost but effective for initiating and sustaining the spontaneous decomposition of of hydrazine-base monopropellants; and (5) which has improved strength characteristics.

Additional objects and advantages of this invention will be set forth in part in the description which follows and in part will be obvious from the description or may be learned by practice of the invention. The objects and advantages are realized and attained by means of the compositions, processes, and methods particularly pointed out in the appended claims.

To achieve the foregoing objects and in accordance with its purpose, as embodied and broadly described, the method of this invention comprises preparing a catalyst for decomposing hydrazine-base monopropellants by contacting a high surface area carrier with an alcohol solution of a salt of a precious metal selected from the group consisting of salts of iridium, ruthenium, and mixtures thereof, to deposit from about ½ to 8% by weight of the precious metal contained in the selected salts, based on the total weight of the catalyst, on the exterior surface only of the carrier; and reducing the precious metal on the exterior surface to an active pure metal by contact with a fluid reducing agent selected from the group consisting of hydrogen and hydrogen-inert gas mixtures.

Preferably, the salt used in this process is a chloride salt of iridium or ruthenium. Catalysts formed by depositing a salt from an alcohol solution in the manner just described contain the precious metal on the exterior surface only of the carrier material. Tests have shown that the precious metal is actually contained within the outer 10 percent of the particle diameter of the carrier material; and as used herein, the term "on the exterior surface only" of the carrier, refers to a precious metal contained within the outer 10 percent of the carrier particle diameter.

The carrier preferably comprises alumina having an average particle size of 20 to 30 mesh and is desirably subjected to a cleaning and particle polishing process before being impregnated with the alcohol solution. The particle polishing process removes the weaker particles by breaking them up and removes the rough edges on other particles by polishing.

Preferably, the total amount of iridium contained on the exterior surface of the catalyst is between ½ and 4% by weight, based on the total weight of catalyst, and the total amount of ruthenium contained on the exterior surface is between 4 and 8% by weight, based on the total weight of the catalyst.

The precious metals are preferably deposited on the carrier by a number of solution soakings, with each soaking depositing an equal amount of metal on the carrier. Where more than one solution soaking is made, the carrier is preferably subjected to heat treatment between each solution soaking and after the final soaking to oxidize the metal salts deposited from each soaking.

It is also preferred that the carrier be dried before this heat treatment to remove the alcohol from the carrier. This procedure minimizes breaking up of the carrier during the heat treatment.

Desirably, the reduction step follows the final heat treatment and a 90% hydrogen-10% helium mixture is the preferred fluid reducing agent for this step.

In a particularly preferred form of the method of this invention, the interior of the carrier is impregnated with a second metal catalyst. The second metal catalyst is preferably deposited on the carrier by a solution impregnation technique from an aqueous solution containing a compound of the second metal catalyst. After the carrier is impregnated with the aqueous solution of the second metal compound, it is preferably dried to remove solution water, and the second metal is reduced to pure, active metal by contact with a fluid reducing agent selected from the group consisting of hydrogen and hydrogen-inert mixtures.

This invention further embraces a catalyst produced by the method of this invention which may be described as a catalyst having the ability to initiate and sustain the decomposition reaction of hydrazine-base monopropellants and to restart the reaction once an initial flow of monopropellant has been terminated and the temperature has fallen below the auto-decomposition temperature of the monopropellant. The catalyst does not itself change during the decomposition reaction, has excellent structural and catalytic stability during use in hydrazine-base monopropellant decomposition reactions, and has desirably long life. The catalyst comprises a carrier material selected from high surface area ceramics and ½ to 8% by weight of metal, based on the total weight of catalyst, of at least one active material selected from the group consisting of iridium, ruthenium and mixtures thereof.

Preferably, the catalyst contains a second metal catalyst, deposited primarily within the interior of the carrier, the second metal catalyst being present to enhance the catalytic activity of the catalyst and provide improved reaction performance characteristics. It is further preferred that from about ½ to 4 percent by weight of iridium be deposited on the exterior surface of the catalyst, and from about 4 to 8 percent by weight of ruthenium be deposited primarily within the interior of the catalyst.

It is to be understood that both the foregoing general description and the following detailed description are exemplary and explanatory but are not restrictive of the invention.

The accompanying drawings illustrate the results of microprobe analysis tests conducted on a number of samples of catalysts produced in accordance with the teachings of this invention and samples of catalysts produced by other methods.

Figure 3:
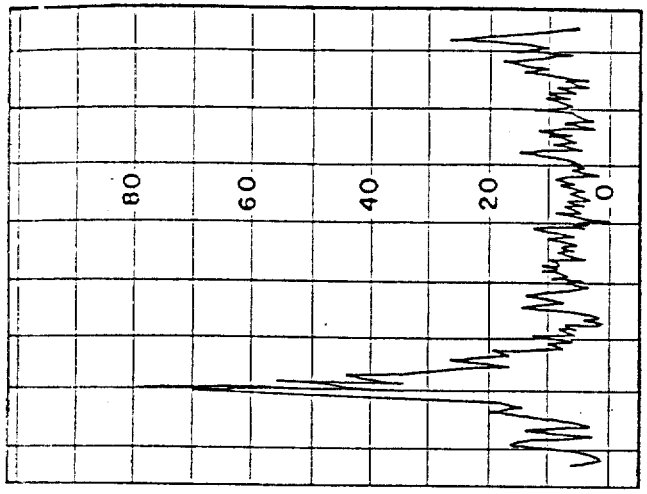
FIG. 3 is a microprobe analysis conducted on a catalyst having a ruthenium content deposited on the catalyst by an alcohol solution in accordance with the teachings of this invention.

In accordance with the method of this invention the first step in preparing a catalyst for decomposing hydrazine-base monopropellants comprises contacting a high surface area carrier with an alcohol solution of a salt selected from the group consisting of salts of iridium, ruthenium, and mixtures thereof, to deposit from about ½ to 8 percent by weight of the selected metals contained within the salts, based on the total weight of catalyst, on the exterior surface only of the carrier.

As here embodied, the alcohol solution is uniformly impregnated on the exterior surface of a suitable carrier having a high surface area. The primary function of the carrier is to provide a high surface area on which the active catalytic material can be deposited. The carriers useful in this invention can be of various shapes and sizes and include pellets of spherical or cylindrical shape, granules, tablets, honeycomb, screen, porous metal, ceramic foam, or metal shot.

These carriers must be capable of satisfactorily enduring the severe chemical, thermal and mechanical environments to which they will be subjected during the decomposition reaction of the hydrazine-base monopropellant without losing appreciable surface area. Loss of surface area occurs during monopropellant decomposition due to such factors as crushing, ablating, erosion, and poisoning of the active catalytic material.

In addition, the carriers should have a uniform porosity and exhibit an environmental compatibility with the decomposition products of the hydrazine-base monopropellant. Ceramic-type materials have been found to be particularly effective as carriers. Alumina, zirconia, hafnia, silica, magnesia, aluminosilicates, carbon and the nitrides and carbides of aluminum, zirconium, hafnium, and silicon are exemplary of the carrier materials that can be used in the present invention as carriers.

Alumina is the presently preferred carrier material and the form of alumina sold under the trade designation RA-1 by the Reynolds Metals Company is presently considered to provide optimum results. This alumina has a high surface area of approximately 200 sq. meters per gram, can withstand thermal shock, and has a uniform structure from its exterior to its interior.

The RA-1 form of alumina is actually a hydrate scale of $Al_2O_3$ that is obtained from batch process precipitation tanks used by Reynolds to produce alumina. The RA-1 alumina is formed by removing water from the alumina hydrate to obtain a suitably porous alumina structure.

The carrier materials useful in this invention can have an average particle size of approximately 6 to 40 mesh but preferably have an average particle size of 20 to 30 mesh (U.S. screen size) and a particle distribution of from 6 to 40 mesh. Carrier particles having an average particle size of 30–35 mesh have produced satisfactory results as well as particles having an average size of 8 to 10 mesh. Particles having an average particle size of 20–30 mesh are preferably used near the injector nozzle inlet for the catalyst bed while particles having an average size of 14–18 mesh are preferably used near the exhaust nozzle.

The carrier materials usually contain a significant quantity of foreign particles and preferably these materials are removed before impregnating the carrier with the salt solution. For example, the "as received" alumina granules contain large quantities of iron oxide, dirt and silica particles. These foreign particles are removed by hand cleaning and then screening the particles.

The clean granules can be impregnated with the alcohol solution, but preferably they are first subjected to a particle polishing process which removes the weaker particles via breakage and provides particles having a more spherical shape. This preliminary breakage treatment of the particles assures that only particles having a high strength are used in the catalyst bed. The bed strength of a catalyst bed formed from these particles is therefore significantly greater than a bed formed by particles that have not been subjected to this process.

The preferred particle polishing process comprises screening the cleaned particles to include particles greater than 30 mesh and introducing these particles into air attrition loops. These loops preferably are rectangular loops of glass tubing having an opening into which a high velocity gas stream can be fed. The high velocity gas circulates the particles in the loop in such a manner that the particles rub against each other to thereby remove their rough edges and polish their outer surface while at the same time the weaker particles completely break up or crumble and are thereafter removed.

The polished particles are then preferably chemically precleaned. Chemical precleaning of the polished particles comprises first thoroughly washing the particles in distilled water and then in a one molar solution of aluminum chloride or aluminum nitrate. The particles are then preferably washed two to four more times with fresh aluminum chloride or nitrate solution and preferably are then finally washed with distilled water. The washed granules are dried at an elevated temperature of approximately 250° F. within a nitrogen purged oven. Volatile or decomposable substituents, such as aluminum chloride or nitrate can thereafter be removed from the particles by heating in air at a temperature of about 500° C. for about ½ hour. The particles are cooled to room temperature where they are screened to an average particle size of 20 to 30 mesh.

The polished and chemically precleaned carrier particles are impregnated with an alcohol solution of a salt of ruthenium, iridium, or mixtures thereof, to deposit from about ½ to 8 parts by weight of ruthenium, iridium, or mixtures thereof, contained within the salt, on the exterior surface only of the carrier.

The alcohol used in this invention for depositing the precious metal on the exterior surface of the carrier is a low boiling alcohol that will readily dissolve salts of these precious metals. Alcohols suitable for use in this invention include isopropyl alcohol, methyl alcohol, ethyl alcohol and butyl alcohol. Preferably, the alcohol is a reagent grade alcohol, such as, for example, reagent grade isopropyl alcohol.

The salt used in forming the alcohol solution is a salt which will readily dissolve in the alcohol selected. When depositing iridium on the catalyst, suitable iridium salts include iridium trichloride and iridium tetrachloride. Iridium trichloride is preferred since it is available commercially having an impurities content of less than 0.2% which, for purposes of this invention, does not interfere with the production of a useful catalyst. When depositing ruthenium on the catalyst, suitable salts of ruthenium include ruthenium trichloride and ruthenium tetrachloride. Ruthenium tetrachloride is preferred since it is available commercially having low impurities content which does not interfere with the production of a useful catalyst.

The alcohol solution of precious metal used to impregnate the carrier can be prepared by slowly adding the selected precious metal salt to the alcohol while heating the solution to approximately 50° to 60° C. Alternately, the alcohol solution can be prepared by initially heating the alcohol to 50° to 60° C., and then slowly dissolving the salt in the alcohol while maintaining the temperature of the solution at 50° to 60° C.

When the precious metal salt used is either iridium or ruthenium trichloride, it is desirable to add chlorine to the alcohol solution to form the more soluble tetravalent chloride of the salt rather than the trivalent chloride formed by the addition of salt. The addition of chlorine results in a solution that is unlikely to form undesirable precipitates upon heating and during subsequent impregnation of the catalyst. Preferably, the trichloride solution is maintained at a temperature of 30°–60° C. and the chlorine is added to the trichloride solution at a rate of approximately 100 cc. per min. for 5 to 15 minutes. After the salt is dissolved in the alcohol, makeup alcohol can be added, if necessary, to bring the solution to the desired concentration. The solution is then cooled to room temperature and preferably allowed to age and stabilize a minimum of 15 hours.

The salt used to produce the alcohol solution is added to the alcohol in amounts such that the solution contains 0.5 to 10% by weight of the precious metal. It is preferred, however, to form solutions containing low concentrations of the metal. Since the total amount of precious metal deposited on the carrier is relatively small, the metal can be deposited on the carrier in one soaking. It is desirable, however, to use more than one solution soaking step, with each soaking depositing a portion of the desired total metal content. This procedure achieves a better bond and improved distribution of the active metal to the carrier.

In the preferred embodiments of this invention, the precious metal is deposited on the carrier in 2% increments, with the total amount of precious metal being in the range of 2 to 8 weight percent of metal, and being deposited in 1 to 4 soaking steps. When depositing iridium on the exterior surface of the carrier, the total amount of iridium deposited is preferably between $\frac{1}{2}$ and 6 weight percent, based on the total weight of the catalyst, but the presently preferred amount is approximately 2% iridium. When depositing ruthenium on the exterior surface of the carrier, the total amount of ruthenium deposited is preferably between 2 to 8% ruthenium, based on the total weight of the catalyst, but preferably from 4 to 8% is deposited. Presently, it is considered most preferable to deposit about 6% ruthenium.

It is also possible to deposit both iridium and ruthenium on the exterior surface only of the carrier. When depositing both of these metals on the exterior surface, it is presently preferred to deposit 2% iridium and 6% ruthenium on the exterior surface. The deposition of both materials on the exterior surface can be performed by forming an alcohol solution containing salts of both of these metals, and then contacting the carrier with the alcohol solution to simultaneously deposit both metals on the exterior surface of the catalyst. As with the deposition of only one of these metals, the metals can be deposited on the carrier in one soaking but it is desirable to use more than one soaking step, with each soaking depositing a portion of the desired total metal content.

For each impregnation or solution soaking, the salt containing alcohol solution is carefully contacted with the carrier particles to provide uniform coverage. The contacting of the carrier granules with the solution is preferably performed with vigorous mixing and appreciable heating results from the heat of wetting. Each soaking step can be satisfactorily performed by adding the solution to the carrier and then thoroughly mixing in a jar mill for 5 minutes. It has been found that the carrier is adequately wetted if the solution volume approximates three-quarters of the carrier volume.

Before the impregnated carrier is subjected to reduction by a hydrogen flow, the carrier wetted with the salt solution is preferably dried. Drying can be accomplished by any conventional means such as by directing a stream of hot air onto the carrier. For example, hot air from a hot air gun can be directed onto the wetted carrier while rotating the wetted carrier inside a glass beaker to dry the carrier. When using more than one solution soaking of the carrier, the carrier is preferably dried between each soaking and after the final soaking. The carrier is sufficiently dried when the carrier particles become free flowing.

After drying, but before the impregnated carrier is reduced, the carrier can, if desired, be subjected to a heat treatment step. The heat treatment step comprises heating the dried carrier to an elevated temperature to convert the metal salt to its oxides. The conversion of the salt to oxides achieves a more permanent bond of the metal to the carrier and aids in preventing subsequent solutions from redissolving the salt. Depending on the salt used, the temperature of conversion can range from 650° F. to 1,200° F.

The heat treatment step can be conveniently performed by preheating a glass beaker to the desired temperature and then placing the dried carrier within the beaker for 5 to 20 minutes, but preferably for at least 15 minutes, while maintaining the temperature of the beaker at the preheat temperature. The dried carrier particles are preferably mixed at least three or four times during the heat treatment to aid in expelling gases from the carrier and preventing temperature gradients from occurring throughout the mass of carrier particles.

After the carrier particles are heat treated, they are allowed to gradually cool to room temperature. When using more than one solution soaking, the carrier particles can be subjected to the heat treatment step between each soaking and after the final soaking step.

In accordance with a preferred embodiment of this invention, the interior structure of the carrier is impregnated with a second metal catalyst. It has been found that although a precious metal deposition on the exterior surface only of the catalyst produces a catalytic effect, such a catalyst does not at all times achieve a satisfactory monopropellant decomposition reaction because hydrazine-base monopropellants tend to flood the interior of the catalyst and inhibit the catalytic reaction. This problem of flooding is substantially eliminated, however, by providing a second metal catalyst in the interior of the carrier by depositing the second metal catalyst uniformly throughout the carrier. A uniform deposition throughout the carrier results in the second metal catalyst being deposited primarily in the interior of the carrier, that is, primarily within the inner 90% of the carrier particle diameter.

The second metal that is primarily deposited in the interior of the carrier can comprise any metal that is known for achieving a catalytic effect. Generally, these metals are found in Group IIB through IVB of the periodic table. The second metal deposited on the carrier preferably is selected from the following metals: molybdenum, nickel, cobalt, iron, the precious metal (iridium or ruthenium) that is not deposited on the exterior of the carrier, and mixtures thereof. The amount of second metal deposited within the interior of the carrier will vary with the particular metal used. For example, it is presently preferred that the carrier have from 5 to 15% molybdenum, 3 to 35% nickel, 3 to 20% cobalt or 2 to 15% ruthenium deposited within the interior surface of the carrier, based on the total weight of the catalyst.

The precious metal iridium has been found to produce the greatest catalyst effect and therefore it is the metal that is preferably deposited on the exterior of the carrier. Moreover, the precious metal ruthenium has been found to be the second best catalyst and therefore it is the preferred metal for deposition uniformly throughout the carrier. When using an iridium-ruthenium catalyst, it is preferred to have $\frac{1}{2}$ to 4 percent iridium on the exterior of the carrier and 4 to 8 percent ruthenium deposited uniformly throughout the carrier, with 2 percent iridium and 6 percent ruthenium presently considered to provide satisfactory results.

The second metal is deposited uniformly throughout the carrier by contacting the carrier with an aqueous solution containing a compound of the second metal. The compound used in forming the aqueous solution preferably is one that readily dissolves in water. For example, when depositing cobalt as the second metal, the compound is a cobalt salt such as cobaltous nitrate; when depositing molybdenum, the compound is a molybdenum trioxide containing complex such as molybdosilicic acid; when depositing ruthenium, the compound is a salt of ruthenium such as ruthenium trichloride. Aqueous solutions prepared from these compounds penetrate into the interior of the carrier to deposit the compounds within the interior.

The aqueous solution of second metal compound used to impregnate the carrier can be prepared by adding the compound to distilled water and heating the resulting mixture to speed the dissolution of the compound in water. After the compound is dissolved in the water, makeup water can be added, if necessary, to bring the solution to the desired concentration. The aqueous solution is then cooled to room temperature prior to impregnation.

As with the deposition on the exterior surface only, the total amount of second metal deposited within the carrier is relatively small, and can therefore be deposited on the carrier in one soaking step. It is desirable, however, to use more than one solution soaking step, with each soaking step depositing a portion of the desired total second metal content. This procedure achieves a better bond and more uniform distribution of the active metal to the carrier.

When depositing either molybdenum or cobalt as the second metal, it is preferred to deposit these metals in 5% increments, whereas when depositing ruthenium as the second metal, it is preferred to deposit the metal in 2% increments. For each impregnation or solution soaking, the aqueous solution is carefully contacted with the carrier particles to provide uniform coverage. The soaking step can be satisfactorily performed by adding the solution to the carrier and then thoroughly mixing, for example, in a jar mill for 5 minutes.

Similar to the deposition of the precious metal on the exterior, after the carrier is contacted with the aqueous solution containing a compound of the second metal and before the carrier is subjected to the reducing step, the carrier is preferably dried by any conventional means such as by directing a stream of hot air onto the carrier. When using more than one solution soaking of the carrier to deposit the second metal, the carrier is preferably dried between each soaking and after the final soaking. After the carrier containing the second metal is dried, the carrier can, if desired, be subjected to a heat treatment step. The heat treatment step comprises heating the dried carrier to an elevated temperature to convert the compound containing the second metal to its oxides. Depending on the compound used, the temperature of conversion can range from 650° F. to 1200° F. The heat treatment can be conveniently performed by using the same technique as that described above in connection with heat treating the carrier when the precious metal is deposited on the exterior of the catalyst.

The second metal can be added to the carrier either before or after the carrier is treated with the alcohol solution. When adding the second metal to the carrier after it is treated with the alcohol solution, it is preferred to always heat treat the carrier to convert the salt of the precious metal in the alcohol solution to the oxide. The oxide of the precious metal is insoluble in alcohol or aqueous solutions and is thus fixed to the outer surface of the carrier. The fixing of the precious metal to the outer surface permits subsequent impregnation of the second metal catalyst via an aqueous solution without disturbing the precious metal from the outer surface and without redissolving the precious metal in the aqueous solution. After the heat treatment, the carrier is allowed to cool and stabilize before being contacted with the aqueous solution containing the second metal.

When applying the aqueous solution before applying the alcohol solution, the carrier is also preferably heat treated to convert the metal compounds within the aqueous solution to their oxides and is preferably subjected to a hydrogen reduction to convert the oxides of the second metal to the pure metal before the alcohol solution is applied. The loss of minor amounts of second metal from the interior of the carrier does not, however, have as serious an effect on the catalytic properties of the catalyst as the loss of precious metal from the exterior surface of the catalyst, and, therefore, the heat treatment step to convert the second metal compound to oxides can, if desired, be eliminated without any significant deterioration of the catalyst properties.

An alternate procedure for adding precious metal to the exterior surface and a second catalyst metal to the interior surface comprises first applying an aqueous solution of the precious metal to the carrier, drying and heat treating the carrier, then adding the second metal by contacting the carrier with an aqueous solution of the second metal, and thereafter contacting the carrier with an alcohol solution of the precious metal.

It is thus apparent that the specific order of applying the precious metal to the exterior surface of the carrier and the second metal to the interior surface can be accomplished in a variety of methods which can include any combination of the various ways of applying the alcohol and aqueous solutions such as by one or more soakings, by heat treating or not heat treating between each soaking step, by hydrogen reducing or not hydrogen reducing between the alcohol and aqueous impregnations, and the like.

In accordance with the invention, the precious metal on the exterior surface of the carrier is reduced to an active pure metal by contact with a fluid reducing agent selected from the group consisting of hydrogen and hydrogen inert gas mixtures. As here embodied, the reduction of the precious metal compound is accomplished by pouring the impregnated carrier particles into a Vycor tube, or a tube made of other suitable materials capable of withstanding a reducing environment, placing the tube in a horizontal furnace which is at a temperature of 500°–650° C., and then admitting reducing gas to the tube. Each end of the tube is provided with a cap, with one cap having an inlet line for admitting the reducing gas and the other cap having an outlet line for withdrawing the reducing gas and reaction products.

Although 100% hydrogen or any of a number of hydrogen-inert gas mixtures can be used as the reducing gas, it is preferred to use a 90% hydrogen-10% helium mixture for the reduction. This mixture can be immediately admitted to the Vycor tube in a single stream or preferably can be gradually built up from an initial flow of 100% helium.

When the mixture is gradually built up, a slow flow of helium is established through the tube for a period of approximately ten minutes, and then hydrogen is added to the helium flow to form a 90% hydrogen-10% helium mixture. As the hydrogen is added, reduction ensues, and this reduction is evidenced by condensation in the colder, outer regions of the gas flow exiting the Vycor tube. The temperature of the furnace is maintained at about 500°–650° C. for approximately 20 minutes to complete the reduction.

After the reduction is completed, the Vycor tube is removed from the furnace while continuing the flow of the reducing gas to the tube. The Vycor tube is then force cooled by cold water to cool to a maximum temperature of approximately 50° C. while the reducing gas continues to flow through the tube. When the tube reaches the desired temperature, the addition of hydrogen to the gas flow is stopped so that only helium continues to flow through the tube. With only helium flowing through the tube, the cap having the outlet line is removed and this end of the tube is immediately inserted into a glass beaker filled with nitrogen. The catalyst particles are dumped from the Vycor tube into the nitrogen filled beaker and then the helium flow is stopped. Air is allowed to displace the nitrogen blanket at a rate slow enough to keep the particles from exceeding 80° C. This procedure minimizes oxidation of the reduced catalyst particles in air.

When the precious metal is deposited on the exterior surface of the carrier using more than one solution soaking, the reduction can be performed after each heat treatment that normally follows the soaking, or when no heat treatment is used, after each soaking. The reduction can, however, be satisfactorily performed by using only one reducing step after the last solution soaking. It is generally preferred to use only one reducing step to reduce the precious metal on the exterior of the carrier to its pure metal form, since the overall procedure is thereby simplified.

When a second metal is deposited uniformly throughout the carrier particles by impregnating the particles with an aqueous solution containing a metal compound of the second metal, this metal compound must be reduced to the pure metal to obtain the desired improvement from the addition of the second metal. As with the reduction of the precious metal on the exterior surface, the reduction can be performed after each heat treatment that normally follows a soaking of the carrier with the aqueous solution, used to deposit the second metal, or when no heat treatment is used, after each soaking. Preferably, however, the reduction of the second metal is performed after all of the second metal compound has been deposited within the carrier. This reduction can be performed simultaneously with the reduction of the precious metal contained within the alcohol solution, or can be performed as a separate step. When only one reduction is used to reduce both the precious metal on the exterior surface and the second metal catalyst, the reduction step is, of course, performed after the aqueous and alcohol solution soakings are completed. When the reduction of the second metal compound is performed as a separate step, the techniques used can be the same as those used to reduce the precious metal on the exterior surface.

An important aspect of this invention is the reduction of the catalysts in a controlled environment with a fluid reducing agent selected from the group consisting of hydrogen and hydrogen-inert gas mixtures. The catalysts produced in this manner exhibit a uniformly reduced structure having active catalytic material uniformly distributed throughout the carrier structure.

The catalysts are thus capable of being immediately used for their catalytic properties and do not have to undergo a chemical reaction with a hydrazine-base monopropellant before they exhibit their catalytic properties. Further, the catalytic activity of the materials so produced remains relatively stable during use and catalyst beds formed from the catalysts of this invention do not undergo volume changes during the hydrazine decomposition reaction. These beneficial results are believed to be due, at least in part, to the controlled hydrogen reduction.

The catalysts produced by the process of this invention thus comprise a high surface area carrier material, and $\frac{1}{2}$ to 8% by weight of active iridium, ruthenium, or mixtures thereof, based on the total weight of catalyst, deposited on the exterior surface only of the carrier material. Preferably, the catalysts contain a second metal catalyst deposited within the interior of the carrier.

The performance characteristics of the catalysts of this invention are comparable to catalysts produced by other and more costly techniques. The catalysts are effective in initiating the decomposition reaction of hydrazine-base propellants and can spontaneously restart the decomposition after an initial flow of hydrazine has ceased and the temperature has fallen below the auto-decomposition temperature. The catalysts are effective for restarting the decomposition reaction at temperatures as low as 30° F. and at temperatures above 150° F. exhibit operating characteristics, in engines, which are quite similar to much more expensive catalysts containing 34% iridium.

The catalysts of this invention are effective for restarting the decomposition reaction at 30° F. even at extreme operating conditions. Thus restart can be achieved at monopropellant flow rates of approximately 0.15 lbs. per second of monopropellant per square inch of catalyst bed cross sectional area—a flow rate or "bed loading" considered to be substantially in excess of normal. At catalyst bed loadings lower than normal, it is possible to restart the decomposition reaction of the monopropellant at temperatures even lower than 30° F.

The catalysts of this invention are also advantageous in that they undergo no visible change in chemical composition.

For a clearer understanding of the invention specific examples of it are set forth below. These examples are merely illustrative of this invention and are not to be understood as limiting the scope and underlying principles of the invention in any way. All percentages referred to herein are by weight unless otherwise specifically indicated.

EXAMPLE 1

As received, RA-1 alumina particles are cleaned by hand and then rounded in an air attrition loop for 15 minutes to remove weaker particles via breakage and remove the rough edges of the stronger particles. The rounded particles are then chemically precleaned by thoroughly washing first in distilled water, and then in a one molar aluminum chloride solution. The particles are then washed four more times with fresh aluminum chloride solution, dried to a temperature of 250° F. in a nitrogen purged oven, and heated in air in a beaker at 500° C. for approximately $\frac{1}{2}$ hour to remove volatiles including aluminum chloride. The particles are then screened to 20 to 30 mesh size.

4.1 grams of iridium trichloride are slowly added to 50 mls. of n-isopropyl alcohol which has been heated to 50° C. The iridium trichloride is slowly dissolved in the alcohol while the alcohol is maintained at a temperature of 50° C. Chlorine gas ($Cl_2$) is bubbled into the alcohol solution for a minimum of 5 minutes while maintaining the temperature at 50° C. The volume of the solution is checked and makeup n-isopropyl alcohol is added to the solution of give 75 mls. of solution. The solution is cooled to room temperature, covered and allowed to age for 15 hours.

After the solution is aged, 100 gms. of the alumina carrier prepared above are placed into a clean open mouth glass beaker. The 75 mls. of alcohol solution are poured into the glass beaker to wet the carrier particles. A clean glass rod is used to stir the carrier while the alcohol solution is contacted with the carrier, and this stirring is continued for one (1) minute to insure a thorough wetting of the carrier. Approximately 2% by weight of the catalyst of iridium is deposited on the exterior surface only of the carrier.

The glass beaker is then placed on a jar mill at an angle of 30° from the horizontal and a hot air stream from a 20 amp. air gun is directed into the open mouth of the beaker to raise the temperature to a minimum of 100° C. until the carrier particles are dry.

After the carrier is dried, the carrier particles are heat treated by heating them in air at 900° F. for fifteen minutes. After the heat treatment, the carrier particles are placed in a Vycor tube which is then inserted in a horizontal tubular furnace set at a temperature of 600° C. A slow helium flow of 40 cm/min. is established through the tube and then hydrogen is added to the helium flow at a rate of 250 cm/min. The flow is continued for forty minutes and reduction to active iridium ensues. The Vycor tube is then cooled to 50° C. with cold water. The hydrogen flow is stopped and one end of the tube is opened and inserted into a glass beaker filled with nitrogen. The catalyst particles are dumped from the Vycor tube into a nitrogen filled beaker and the helium flow is stopped. Air is allowed to displace the nitrogen blanket at a slow rate so that the temperature of the particles does not exceed 80° C.

The resulting product comprises an alumina carrier containing 2% by weight of iridium, which is shown by electron microprobe analysis to be distributed only in the outer 10% of the diameter of the catalyst particles.

EXAMPLE 2

In this example 104 grams of catalyst containing 4% by weight iridium distributed on the exterior surface of an alumina carrier are prepared in accordance with the procedure of Example 1. Two 75 ml. samples of an iridium tetrachloride -n- isopropyl alcohol solution are prepared in accordance with the procedure of Example 1, with each sample depositing 2% iridium on the exterior surface. The carrier is dried and heat treated after each soaking in accordance with the procedure of Example 1, and after the last heat treatment step, the carrier particles are subjected to hydrogen reduction in accordance with the procedure of Example 1. The average particle size of the carrier is 8 to 10 mesh.

EXAMPLE 3

In this example 106 grams of catalyst containing 6% by weight iridium distributed on the exterior surface of an alumina carrier are prepared in accordance with the procedure set forth in Example 1. The iridium tetrachloride is applied to the carrier using three (3) solution soakings, with each soaking depositing 2% iridium on the surface. The carrier is dried and heat treated after each soaking, in accordance with the procedure of Example 1, and after the final heat treatment, the carrier particles are hydrogen reduced in accordance with the procedure of Example 1.

EXAMPLES 4-6

In these examples, catalysts containing 2%, 4%, and 6% ruthenium are prepared by following the procedures of Examples 1-3 above, respectively, with appropriate amounts of ruthenium trichloride being substituted for the iridium trichloride of those examples and added to n-isopropyl alcohol to form ruthenium-alcohol solutions containing the required concentrations of ruthenium.

EXAMPLES 7-9

In these examples, catalysts containing 2%, 4%, and 6% ruthenium are prepared as in Examples 4-6, except that no heat treatment steps are employed and that the catalysts are subjected to a hydrogen reduction after each application of the alcohol solution.

EXAMPLE 10

In this example, 108 grams of a catalyst containing 2% by weight iridium deposited on the exterior surface of an alumina carrier, and 6% by weight of ruthenium deposited uniformly throughout the carrier are prepared by first applying the ruthenium to the carrier from aqueous ruthenium solutions, and then applying iridium to the carrier from an iridium-alcohol solution.

Each of three 75 ml. samples of ruthenium trichloride-distilled water solution is prepared by dissolving 5 gms. of ruthenium trichloride in 50 mls. of water. Each sample is heated to boiling and held at boiling for five minutes. The ruthenium chloride rapidly goes into solution. Each sample is allowed to cool to room temperature and diluted to 75 ml. A 75 ml. sample of an iridium tetrachloride-alcohol solution is prepared in accordance with procedures of Example 1, by bubbling chlorine through an alcohol solution containing 4.1 gms. of iridium trichloride.

Each aqueous ruthenium sample is then added in sequence to 100 gms. of an alumina carrier prepared in accordance with the techniques set forth in Example 1, to deposit approximately 2% by weight of the catalyst of ruthenium from each 75 ml. of solution to thus provide an overall ruthenium content equal to 6% by weight of the catalyst deposited uniformly throughout the carrier.

After each application of 75 ml. of aqueous solution, the carrier is dried by a 20 amp. air gun for approximately 25 minutes to raise the temperature of the carrier to 100° C. and evaporate the water in the solution. After drying, the carrier is heated in air at 700° F. for fifteen minutes and then cooled to ambient temperature. After the last application of aqueous solution, the carrier is subjected to a 90% hydrogen-10% helium flow at a temperature of 500° C. to reduce the ruthenium to its active, pure metallic state. The carrier is then force cooled and exposed to air in accordance with the reducing procedures described in Example 1.

After the reduced carrier is cooled and exposed to air, it is wetted with the iridium tetrachloride-alcohol solution to deposit 2% by weight of the catalyst of iridium on the exterior surface of the catalyst. The carrier particles are then dried, heated in air at 800° F. for 15 minutes, and finally reduced with a 90% hydrogen-10% helium stream in accordance with the reducing procedures of Example 1.

EXAMPLE 11

In this example 106 grams of catalyst containing 4% by weight ruthenium, distributed uniformly throughout the alumina carrier, and 2% by weight of iridium, deposited on the exterior surface of the catalyst, are prepared in accordance with the procedure set forth in Example 10. The ruthenium is applied to the carrier using two (2) solution soakings, with each soaking depositing 2% ruthenium within the carrier. The average particle size of the carrier is 8 to 10 mesh.

EXAMPLE 12

In this example 108 grams of catalyst containing 6% by weight ruthenium distributed uniformly throughout the alumina carrier and 2% by weight of iridium deposited on the exterior surface of the catalyst are prepared in accordance with the general procedure set forth in Example 10. Instead of heating the catalyst in air after the alcohol application of iridium tetrachloride, however, the catalyst is immediately reduced without an air heat treatment step. The average particle size of the carrier is 14 to 18 mesh.

EXAMPLE 13

In this example 108 grams of catalyst containing 6% by weight ruthenium distributed uniformly throughout the alumina carrier and 2% by weight iridium deposited on the exterior surface of the catalyst are prepared in accordance with the following procedure.

Three 75 mls. samples of an aqueous ruthenium trichloride solution and one sample of an iridium tetrachloride alcohol solution are prepared as in Example 10. The alcohol solution is first applied to the carrier to deposit 2% iridium on the exterior surface of the catalyst, dried, heated in air at 900° F. for 15 minutes and then cooled.

Each sample of aqueous ruthenium trichloride solution is then added in sequence to deposit 2% by weight of the catalyst of ruthenium from each 75 ml. sample and thus provide an overall ruthenium content equal to 6% by weight of the catalyst, deposited within the catalyst. The carrier is dried after each aqueous application of ruthenium trichloride but it is not subjected to high temperature air heat treatment.

After the last drying, the carrier particles are subjected to hydrogen reduction in accordance with the procedures of Example 1, to reduce the ruthenium and iridium to their active metallic state.

EXAMPLE 14

In this example 106 grams of catalyst containing 6% by weight ruthenium deposited on the exterior surface of an alumina carrier, and 2% by weight iridium deposited on the exterior surface of the carrier are prepared in accordance with the following procedure.

Each of three 75 mls. samples of an alcohol solution is prepared by dissolving 4.1 gms. of iridium trichloride and 5 gms. of ruthenium trichloride in 50 ml. of n-isopropyl alcohol. Chlorine gas ($Cl_2$) is bubbled into the alcohol solution while heating the solution to 50° C. for 10 minutes. Each sample is then added in sequence to 100 gms. of carrier to deposit from each sample approximately 2% by weight of the catalyst of ruthenium and ⅔ of one percent by weight of the catalyst of iridium.

Between each application of solution, the carrier is dried, and then heated in air at 600° F. for 3 minutes. After the last application, the carrier is dried, heated in air at 600° F., and then hydrogen reduced in accordance with the reducing procedures set forth in Example 1.

EXAMPLE 15

In this example 102 grams of catalyst containing 10% by weight molybdenum distributed uniformly throughout the alumina carrier and 2% by weight of iridium deposited on the exterior surface are prepared in accordance with the following procedure.

28.5 gms. of 12-molybdosilicic acid is added to 100 mls. of distilled water and heated at 50° C. for 30 minutes. Makeup water is added to this mixture to give 140 mls. of an aqueous molybdosilicic acid solution. This solution is divided into two (2) equal 70 ml. samples and these samples are added in sequence to 86.5 gms. of an alumina carrier prepared as in Example 1, to deposit approximately 5% by weight of the catalyst of molybdenum from each sample and to thus provide the catalyst an overall molybdenum content equal to 10% by weight of the catalyst.

After each application of the 70 ml. aqueous solution of molybdosilicic acid the carrier is dried by a 20 amp. air gun for approximately 15 minutes to evaporate the solution water and then heated to 1000° F. for 10 minutes to remove residual and chemically combined water. 75 mls. of an iridium tetrachloride-alcohol solution are prepared as in Example 1, and this solution is applied to the carrier after the last heat treatment to deposit 2% iridium on the exterior surface of the carrier. The carrier is heated at 100° F. for 15 minutes and then subjected to a 90% hydrogen-10% helium flow of reducing gas at a temperature of 550° C. to reduce the iridium to its active metallic state and the molybdosilicates to lower molybdenum oxides and metallic molybdenum.

EXAMPLE 16

In this example 102 gms. of catalyst containing 10% by weight molybdenum distributed uniformly throughout the alumina carrier and 2% by weight iridium deposited on the exterior surface of the carrier are prepared in accordance with the following procedure. Two 70 ml. samples of an aqueous molybdosilicic acid solution and one sample of an iridium tetrachloride alcohol solution are prepared as in Example 15. The alcohol solution is first applied to 86.5 gms. of a carrier to deposit 2% iridium on the exterior surface of the catalyst, dried, heated in air at 1000° F. for 10 minutes and then cooled. Each aqueous solution of molybdosilicic acid is then added in sequence to deposit 5% by weight of the catalyst of molybdenum from each sample, and thus provide an overall molybdenum content equal to 10% by weight of the catalyst deposited within the interior of the catalyst. After each application of the aqueous solution the carrier is dried and then heated at 1000° F. for fifteen minutes. After the last heat treatment the carrier is subjected to a 90%-hydrogen 10%-helium flow of reducing gas at a temperature of 550° C. in accordance with the reducing procedures described in Example 1 to reduce the iridium to its active metallic state and the molybdosilicates to lower molybdenum oxides and metallic molybdenum.

EXAMPLE 17

In this example, 104 gms. of catalyst containing 10% by weight molybdenum distributed throughout the alumina carrier and 4% by weight iridium deposited on the exterior surface of the carrier are prepared in accordance with the following procedure.

Two 75 ml. samples of an iridium tetrachloride-alcohol solution and two 70 ml. samples of an aqueous molybdosilicic acid solution are prepared as in Example 15. One 75 ml. sample of the iridium tetrachloride-alcohol solution is added to the carrier to deposit 2% by weight of iridium on the exterior surface of the carrier. The carrier is dried, heated in air at 900° F. for 15 minutes and then cooled.

Each aqueous solution of molybdosilicic acid is then added in sequence to the alumina carrier to deposit approximately 5% by weight of the catalyst of molybdenum from each sample of solution to thus provide the catalyst an overall molybdenum content equal to 10% by weight of the catalyst. After each application of molybdosilicic acid, the carrier is dried by a 20 amp. air gun for approximately 15 minutes and then heated to 1000° F. for 10 minutes to remove residual and chemically combined water.

After the last heat treatment, the second sample of iridium tetrachloride-alcohol solution is applied to the carrier to deposit 2% by weight of iridium on the exterior surface of the carrier and to thus provide an overall iridium content equal to 4% by weight of the catalyst on the exterior surface of the catalyst. The carrier is heated at 100° F. for 15 minutes and then subjected to a 90%-hydrogen, 10%-helium flow of reducing gas at a temperature of 550° C. to reduce the iridium to its active metallic state and the molybdosilicates to lower molybdenum oxides and metallic molybdenum.

EXAMPLE 18

In this example, 104 gms. of catalyst containing 10% by weight molybdenum distributed uniformly throughout the alumina carrier and 4% by weight ruthenium deposited on the exterior surface of the carrier are prepared in accordance with the following procedure. Two 70 ml. samples of an aqueous molybdosilicic acid solution are prepared in accordance with the procedures set forth in Example 15 and two 75 ml. samples of a ruthenium trichloride solution are prepared as in Example 5. The molybdosilicic acid samples are added in sequence to 86.5 gms. of an alumina carrier prepared as in Example 1 to deposit approximately 5% by weight of the catalyst of molybdenum from each sample to thus provide the catalyst an overall molybdenum content equal to 10% by weight of the catalyst. After each application of aqueous solution, the carrier is dried, heated in air at 1000° F. for 10 minutes, and cooled.

After the last heat treatment the two samples of ruthenium trichloride-alcohol solution are added in sequence to the carrier to deposit approximately 2% by weight of the catalyst of ruthenium from each sample to thus provide on the exterior surface of the catalyst an overall ruthenium content equal to 4% by weight of the catalyst. After each application of the alcohol solution the carrier is dried and heated in air at 700° F. for 15 minutes. The carrier is then cooled and subjected to a 90%-hydrogen 10%-helium flow of reducing gas at a temperature of 550° C. to reduce the ruthenium to its active metallic state and the molybdosilicates to lower molybdenum oxides and metallic molybdenum.

EXAMPLE 19

In this example 104 gms. of catalyst containing 10% by weight of molybdenum distributed uniformly throughout the alumina carrier and 4% by weight ruthenium deposited on the exterior surface of the carrier are prepared in accordance with the following procedure.

Two 70 ml. samples of an aqueous molybdosilicic acid solution and two 75 ml. samples of a ruthenium trichloride alcohol solution are prepared as in Example 18 above. The two samples of alcohol solution are added in sequence to 86.5 gms. of the alumina carrier to deposit approximately 2% by weight of the catalyst of ruthenium from each sample to thus provide on the exterior surface of the catalyst an overall ruthenium content equal to 4% by weight of the catalyst. After each application of alcohol solution, the carrier is dried by a hot air gun, heated at 800° F. for 15 minutes, and cooled.

After the last heat treatment the aqueous molybdosilicic acid samples are added in sequence to the carrier to deposit approximately 5% by weight of the catalyst of molybdenum from each sample and to thus provide within the interior of the catalyst an overall molybdenum content equal to 10% by weight of the catalyst. After each application of aqueous molybdosilicic acid solution the carrier is dried and heated to 700° F. for 15 minutes. After the last heat treatment, the carrier is subjected to a 90%-hydrogen 10%-helium flow of reducing gas at a temperature of 550° C. to reduce the ruthenium to its active metallic state and the molybdosilicates to lower molybdenum oxides and metallic molybdenum.

EXAMPLE 20

In this example 101 gms. of catalyst containing 5% by weight molybdenum distributed uniformly throughout the alumina carrier, 2% by weight iridium on the exterior surface of the carrier and 4% by weight ruthenium on the exterior surface of the carrier are prepared in accordance with the following procedure. Each of two 75 ml. samples of an alcohol solution are prepared by dissolving 4.1 gms. of iridium trichloride and 5 gms. of ruthenium trichloride in 50 ml. of n-isopropyl alcohol. Chlorine gas ($Cl_2$) is bubbled into each of the alcohol solutions while heating the solutions to 50° C. for 10 minutes. An aqueous molybdosilicic acid solution of 70 ml. containing 14.3 gms. of molybdosilicic acid is also prepared. The aqueous molybdosilicic acid is applied to the carrier. The carrier is dried and heated at 1000° F. in air for 10 minutes and then cooled. After cooling, the two alcohol samples are added in sequence to 86.5 gms. of the carrier to deposit approximately 2% by weight of the catalyst of ruthenium and 1% by weight of the catalyst of iridium from each sample on the exterior surface of the catalyst to thus provide an overall ruthenium content equal to 4% by weight of the catalyst and an overall iridium content equal to 2% by weight of the catalyst. Between each application of alcohol solution the carrier is dried and heated in air at 700° F. for 15 minutes. After the last application, the carrier is dried, heated in air at 700° F. and then reduced in accordance with the reducing procedures set forth in Example 1.

EXAMPLE 21

In this example 101 gms. of catalyst containing 5% by weight of molybdenum distributed uniformly throughout the alumina carrier, 2% by weight iridium deposited on the exterior surface of the carrier, and 4% by weight ruthenium deposited on the exterior surface of the carrier are prepared in accordance with the following procedure. Two alcohol solutions containing iridium tetrachloride and ruthenium tetrachloride are prepared as in Example 20 and an aqueous molybdosilicic acid solution is also prepared as in Example 20. The alcohol samples are added in sequence to deposit approximately 2% by weight of the catalyst of ruthenium and 1% by weight of the catalyst of iridium from each sample and provide on the exterior surface of the catalyst an overall ruthenium content equal to 4% by weight of the catalyst and an overall iridium content equal to 2% by weight of the catalyst. After each application of alcohol solution, the carrier is dried and heated at 700° F. for 15 minutes. The carrier is cooled and the aqueous molybdosilicic acid solution is then contacted with the carrier. The carrier is dried, heated at 700° F. for 15 minutes and hydrogen reduced in accordance with the reducing procedures set forth in Example 1.

EXAMPLE 22

In this example, 107 gms. of catalyst containing 5% by weight cobalt distributed uniformly throughout the alumina carrier and 2% by weight iridium deposited on the exterior surface of the carrier are prepared in accordance with the following procedure.

21 grams of cobaltous chloride ($CoCl_2.6H_2O$) is added to 50 mls. of distilled water and diluted to 75 ml. to form an aqueous solution containing cobalt, and 75 ml. of an iridium tetrachloride alcohol solution is prepared as in Example 1.

The alcohol solution is applied to 100 gms. of the carrier to deposit 2% by weight of the catalyst of iridium on the exterior surface of the carrier. The carrier is then dried and heated in air at 1000° F. for 15 minutes to oxidize the chloride salt. The carrier is cooled and then the aqueous solution of cobaltous nitrate is applied to the carrier to deposit 5% by weight of the catalyst of cobalt within the interior of the carrier. The carrier is heated at 900° F. for 10 minutes and then subjected to a hydrogen reduction in accordance with the reducing procedures of Example 1.

EXAMPLE 23

In this example, 112 grams of catalyst containing 10% by weight of cobalt distributed uniformly throughout the alumina carrier and 2% by weight iridium deposited on the exterior surface of the carrier are prepared in accordance with the following procedure.

Two 75 mls. samples of an aqueous cobaltous nitrate solution are prepared as in Example 22 and one 80 ml. sample of an iridium tetrachloride alcohol solution is prepared as in Example 22. The catalyst is prepared in accordance with the procedures set forth in Example 22 except that the cobalt is applied to the carrier by adding in sequence each sample of aqueous solution to the carrier to deposit 5% cobalt uniformly throughout the carrier from each sample to thus provide an overall cobalt content of 10%. The carrier is dried and heat treated after each soaking with aqueous solution.

EXAMPLE 24

In this example, 107 grams of catalyst containing 5% by weight cobalt distributed uniformly throughout the alumina carrier and 2% by weight iridium deposited on the exterior surface of the carrier are prepared in accordance with the following procedure. One 75 ml. sample of an aqueous cobalt solution and one 75 ml. sample of an iridium tetrachloride solution are prepared as in Example 22. The aqueous cobalt solution is first applied to the carrier to deposit 5% by weight of cobalt uniformly throughout the carrier. The carrier is then heated at 900° F. for 10 minutes and cooled. The alcohol solution is then applied to the carrier to deposit 2% by weight of iridium on the exterior surface of the carrier. The carrier is heated at 900° F. for 10 minutes and subjected to hydrogen reduction in accordance with the reducing procedures of Example 1 to obtain active cobalt metal throughout and active iridium metal on the surface of the carrier.

EXAMPLE 25

In this example, 115 grams of catalyst containing 15% by weight cobalt distributed uniformly throughout the alumina carrier and 2% by weight of iridium deposited on the exterior surface of the catalyst are prepared in accordance with the following procedure.

Three 75 ml. samples of an aqueous cobaltous nitrate solution and two 80 ml. samples of an iridium tetrachloride alcohol solution are prepared. One of the alcohol samples is first applied to the carrier to deposit 1% iridium on the exterior surface of the carrier. The carrier is dried, heated in air at 900° F. for 15 minutes and then cooled.

After cooling, the three aqueous cobaltous nitrate solutions are added in sequence to the carrier to deposit 5% by weight of the catalyst of cobalt from each sample. After each aqueous application of cobaltous nitrate the carrier is heated at 900° F. for 15 minutes and then cooled.

After the last application of aqueous cobaltous nitrate solution the second alcohol solution is applied to the carrier to deposit an additional 1% of iridium on the exterior surface of the carrier and to thus provide an overall iridium content of 2% deposited on the exterior surface. The carrier is heated in air at 900° F. for 15 minutes, cooled and then subjected to hydrogen reduction in accordance with the reducing procedures of Example 1.

EXAMPLE 26

In this example, 120 grams of catalyst containing 20% by weight cobalt distributed uniformly throughout the alumina carrier and 2% by weight iridium deposited on the exterior surface of the catalyst are prepared in accordance with the procedures of Example 25. The cobalt is applied to the carrier using four solution soakings of aqueous cobaltous nitrate solution with each soaking depositing 5% cobalt within the carrier, and thus providing an overall cobalt content of 20%.

EXAMPLES 27–46

Each example in Examples 27–46 corresponds to a preceding example in that the procedures used and the total metal content deposited on the carrier is identical to a preceding example, except that where the preceding examples used an alcohol solution to impregnate the carrier with a precious metal, each example of Examples 27–46 uses an aqueous solution to deposit the precious metal on the carrier.

Table I below correlates Examples 27–46 with the previous Examples 1–26 to indicate identical procedures, quantities, concentrations, temperatures and the like except for the use of an aqueous solution instead of an alcohol solution.

TABLE I

| Ex. No. Deposition from Al. Soln. | Metal Added from Aq. Soln. | Precious Metal added from Al. Soln. | Ex. No. Deposition from Aq. Soln. | Metal Added from Aq. Soln. |
|---|---|---|---|---|
| 1 |  | 2% Ir | 27 | 2% Ir |
| 2 |  | 4% Ir | 28 | 4% Ir |
| 3 |  | 6% Ir | 29 | 6% Ir |
| 4 |  | 2% Ru | 30 | 2% Ru |
| 5 |  | 4% Ru | 31 | 4% Ru |
| 6 |  | 6% Ru | 32 | 6% Ru |
| 7 |  | 2% Ru | 33 | 2% Ru |
| 8 |  | 4% Ru | 34 | 4% Ru |
| 9 |  | 6% Ru | 35 | 6% Ru |
| 10 | 6% Ru | 2% Ir | 36 | 2% Ir, 6% Ru |
| 11 | 4% Ru | 2% Ir | 37 | 2% Ir, 4% Ru |
| 12 | 6% Ru | 2% Ir | 38 | 2% Ir, 6% Ru |
| 13 | 6% Ru | 2% Ir | 39 | 2% Ir, 6% Ru |
| 14 |  | 2% Ir, 6% Ru | 40 | 2% Ir, 6% Ru |
| 15 | 10% Mo | 2% Ir | 41 | 2% Ir, 10% Mo |
| 16 | 10% Mo | 2% Ir | 42 | 2% Ir, 10% Mo |
| 17 | 10% Mo | 4% Ir | — | — |
| 18 | 10% Mo | 4% Ru | 43 | 4% Ru, 10% Mo |
| 19 | 10% Mo | 4% Ru | 44 | 4% Ru, 10% Mo |
| 20 | 5% Mo | 2% Ir, 4% Ru | 45 | 2% Ir, 4% Ru, 5% Mo |
| 21 | 5% Mo | 2% Ir, 4% Ru | 46 | 2% Ir, 4% Ru, 5% Mo |
| 22 | 5% Co | 2% Ir | — | — |
| 23 | 10% Co | 2% Ir | — | — |
| 24 | 5% Co | 2% Ir | — | — |
| 25 | 15% Co | 2% Ir | — | — |
| 26 | 20% Co | 2% Ir | — | — |

EXAMPLE 47

Tests are run on the catalysts produced in Examples 1–46 to determine the distribution of the precious metal on the carrier.

In this example, microprobe analysis tests are performed which show the relative concentration level of a metal through a cross-section of the catalyst. Microprobe analysis combines the techniques of electron microscopy and x-ray spectroscopy to analyze a sample containing one micromicrogram of material. The instrument used in microprobe analysis has an electro-optical system which produces an electron focus beam of approximately one micron in diameter. The beam excites characteristic x-rays from the sample. The x-rays are then sorted by means of a curved crystal spectropgraph and presented on a recorder.

X-ray distribution scans for various Examples are illustrated in FIGS. 1-4. The vertical scale on each Figure is a measure of the relative concentration level of the metal on the carrier and the horizontal scale shows the cross-sectional traverse of the x-ray beam.

Figure 2:
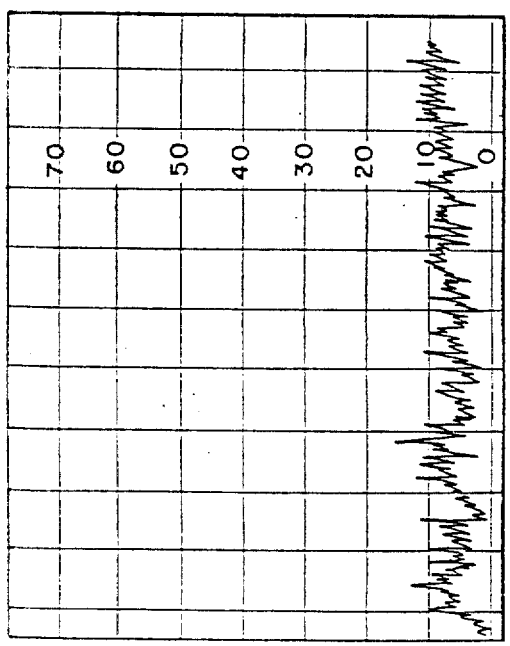
FIG. 2 is a microprobe analysis conducted on a catalyst produced in the same manner as the catalyst of FIG. 1 except for an iridium deposition via an aqueous solution.
Figure 1:
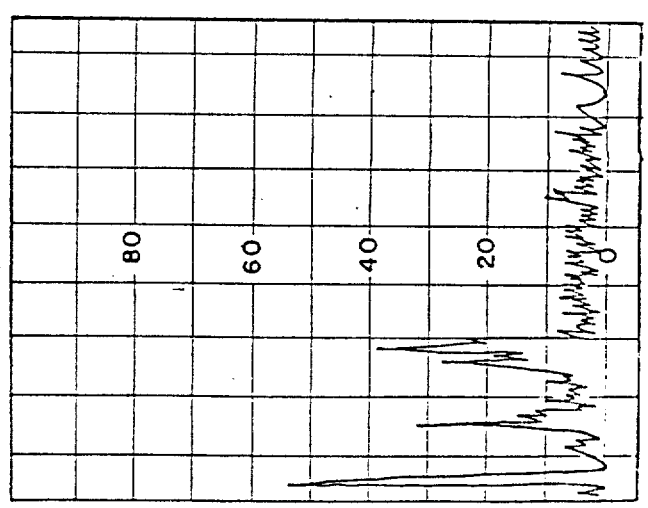
FIG. 1 is a microprobe analysis conducted on a catalyst having an iridium content deposited on the catalyst by an alcohol solution in accordance with the teachings of this invention.

FIG. 1 shows the microprobe analysis for the catalysts produced in Example 2. This catalyst has a 4% iridium content deposited from an alcohol solution. FIG. 2 shows a microprobe analysis of the catalyst produced in Example 28. This catalyst is produced in an identical manner to the catalyst of Example 2, except for the iridium addition via an aqueous solution rather than an alcohol solution. FIG. 2 shows a more uniformly distributed iridium loading profile whereas FIG. 1 shows that the iridium is concentrated on the surface of the carrier. FIGS. 1 and 2 thus show that surface concentration of iridium is achieved by an alcohol impregnation, and that no surface concentration is achieved with an aqueous impregnation.

Figure 4:
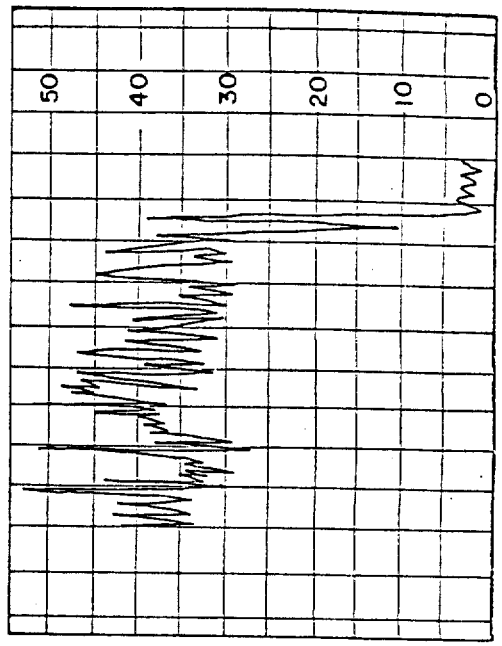
FIG. 4 is a microprobe analysis conducted on a catalyst produced in the same manner as the catalyst of FIG. 3 except that the ruthenium deposition is made via an aqueous solution.

Similarly, FIG. 3 shows a microprobe analysis for the ruthenium content of the catalyst produced in Example 5. An alcohol impregnation was used to deposit the ruthenium on this catalyst. FIG. 4 shows a microprobe analysis for the ruthenium content of Example 31. The catalyst of Example 31 was prepared in an identical manner to the catalyst of Example 5 except for a ruthenium addition via an aqueous solution instead of an alcohol solution. Again, the microprobe analysis shows that alcohol impregnation results in surface concentration of the precious metal, whereas aqueous impregnation results in a more uniform distribution of the precious metals throughout the carrier structure. Microprobe analyses were performed for each of the catalysts produced in Examples 1–47. These tests confirmed that a surface concentration of precious metal is achieved from alcohol impregnation, where the precious metal is contained within less than the outer 10% of the particle diameter, while a more uniform distribution of metal is achieved from an aqueous solution impregnation.

EXAMPLE 48

In this Example tests were made to determine the total surface area of the catalyst. The total surface area includes contributions from both the carrier material and active material. These tests are based on low temperature nitrogen absorption and BET (Brunauer, Emmett and Teller) theory. BET theory permits calculation of the surface area of catalysts from measurements of the volume of gas absorbed on the surface as a function of equilibrium pressure over the catalyst.

A NUMINCO Model AFA-4 test instrument was used to obtain volume-pressure measurements. The test instrument has a sample bulb into which a weighed quantity of catalyst is placed. The bulb is connected to a mechanical pump for degassing. A liquid nitrogen bath is then placed around the sample bulb. Known volumes of nitrogen gas are repeatedly expanded into the sample bulb. The difference between successive equilibrium absorption pressure values before and after expansion yield several absorption points for a standard BET plot, and accuracy of ±5% is obtainable in about one hour after degassing.

The results of total surface area tests on ruthenium and iridium catalysts are shown in Tables II and III below.

TABLE II

| Ir. Content | Ex. No. (Alcohol deposition) | BET Total Surface Area $M^2/GM$ | Ex. No. (Aqueous deposition) | BET Total Surface Area $M^2/GM$ |
|---|---|---|---|---|
| 2% | 1 | 171 | 27 | 166 |
| 4% | 2 | 168 | 28 | 164 |
| 6% | 3 | 167 | 29 | 158 |

TABLE III

| Ru. Content | Ex. No. (Alcohol deposition) | BET Total Surface Area $M^2/GM$ | Ex. No. (Aqueous deposition) | BET Total Surface Area $M^2/GM$ |
|---|---|---|---|---|
| 2% | 4 | 189 | 30 | 161 |
| 4% | 5 | 159 | 31 | 158 |
| 6% | 6 | 152 | 32 | — |
| 2% | 7 | 171 | 33 | 165 |
| 4% | 8 | 153 | 34 | 151 |
| 6% | 9 | 146 | 35 | 138 |

These tables indicate that catalysts prepared from alcohol solutions contain higher surface areas than those impregnated from aqueous solutions. Since alcohol solutions of the precious metal salts concentrate on the surface of the carrier and are prone to crystallite coalescence, higher surface areas would be expected than those achieved where the metal is more uniformly distributed within the carrier. The total surface area tests thus indicate that catalysts of this invention, prepared from alcohol solutions, have a concentration of active metal on their exterior surfaces, while catalysts prepared from aqueous solutions have active metal more uniformly distributed throughout the structure of the catalyst.

EXAMPLE 49

In this example tests were performed to measure the exposed surface area of the catalyst. These tests are based on the principles of hydrogen chemisorption at room temperature. Chemisorption involves specific chemical inter-reaction between gas molecules and surface atoms. Chemisorption results for catalysts containing iridium, ruthenium and molybdenum are presented in Table IV below.

TABLE IV

| Percent Precious Metal Added | Ex. Number (Alcohol deposition) | Hydrogen Chemisorption moles H2 Absorbed/GM Samples | Ex. Number (Aqueous deposition) | Hydrogen Chemisorption moles H2 Absorbed/GM Samples |
| --- | --- | --- | --- | --- |
| 2% Ir | 15 | 30 | 41 | 40 |
| 2% Ir | 16 | 50 | 42 | 70 |
| 4% Ru | 18 | 35 | 43 | 55 |
| 4% Ru | 19 | 30 | 44 | 40 |
| 2% Ir, 4% Ru | 20 | 70 | 45 | 110 |
| 2% Ir, 4% Ru | 21 | 115 | 46 | 150 |

Table IV indicates that chemisorption values established by alcohol impregnation are lower than those established by aqueous impregnations. Higher chemisorption results indicate a more uniform cross-sectional distribution of active metal while lower values indicate a concentration of metal on the surface of the carrier. The data of Table IV thus establishes that metals deposited via aqueous solutions are uniformly distributed throughout the carrier whereas metals deposited by alcohol solutions are distributed primarily at the exterior surface of the carrier.

EXAMPLE 50

In this example, the catalyst prepared in Example 13 is tested in a 600 lb. thrust range engine by forming a catalyst bed containing 650 grams of catalyst. The catalyst is effective for initiating the decomposition reaction of a hydrazine-base monopropellant at a temperature of 0° F. Subsequent restarts after the initial flow of monopropellant has ceased are made with temperatures of the catalyst bed as low as 30° F. The catalyst is effective in sustaining the decomposition of high flow rates of the monopropellant, and withstands the high pressure drops associated with such flow rates.

The invention is its broader aspects is not limited to the specific details shown and described and departures may be made from such details without departing from the principles of the invention and without sacrificing its chief advantages.

What is claimed is:

1. A process for preparing a catalyst for decomposing hydrazine-base monopropellants, comprising:

(a) contacting a high surface area carrier with an alcohol solution of a salt of a precious metal selected from the group consisting of salts of iridium, ruthenium, and mixtures thereof, to deposit from about ½ to 8% by weight of the precious metal contained in the selected salt, based on the total weight of catalyst, on the exterior surface only of the carrier; and (b) reducing the precious metal on the exterior surface to an active pure metal by contact with a fluid-reducing agent selected from the group consisting of hydrogen and hydrogen-inert gas mixtures.

2. A method according to claim 1, wherein the precious metal salt is a chloride salt.

3. A process according to claim 1, which includes heating the carrier to oxidize the metal salts before the reducing step.

4. A process according to claim 3, which includes drying the carrier to remove the alcohol from it before the heating step.

5. A process according to claim 1, wherein the carrier is selected from the group consisting of alumina, zirconia, magnesia, carbon, silica and alumina silicates.

6. A process according to claim 1, wherein ½ to 4% by weight of iridium, based on the total weight of catalyst, is deposited on the exterior surface only of the carrier.

7. A process according to claim 1, wherein 4 to 8% by weight of ruthenium, based on the total weight of catalyst, is deposited on the exterior surface only of the catalyst.

8. A process according to claim 1, wherein the particle size of the carrier is between 6 to 40 mesh.

9. A process according to claim 8, wherein the carrier has an average particle size of 20 to 30 mesh and a particle distribution of from 8 to 40 mesh.

10. A process according to claim 8, which includes precleaning the carrier and removing weaker particles of the carrier by breakage.

11. A process according to claim 1, wherein the precious metal is deposited on the carrier by soaking the carrier in at least two alcohol solutions containing a salt of the precious metal.

12. A process according to claim 11, which includes depositing about an equal amount of precious metal on the exterior surface of the carrier from each solution soaking.

13. A process according to claim 11, which includes heating the carrier between each solution soaking step and after the final solution soaking step to oxidize the metal salt deposited from each soaking.

14. A process according to claim 1, which includes the further step of depositing a second metal catalyst uniformly throughout the carrier.

15. A process according to claim 14, wherein the second metal catalyst is deposited on the carrier by impregnating the carrier with an aqueous solution containing a compound of the second metal catalyst, and reducing the second metal catalyst to an active metal by contact with a fluid reducing agent selected from the group consisting of hydrogen and hydrogen-inert gas mixtures.

16. A process according to claim 15, wherein the second metal catalyst is deposited uniformly throughout the carrier by soaking the carrier in at least two aqueous solutions containing a compound of the second metal catalyst.

17. A process according to claim 16, which includes depositing about an equal amount of second metal catalyst uniformly throughout the interior of the carrier from each solution soaking.

18. A process according to claim 17, which includes heating the carrier between each aqueous solution soaking step and after the final solution soaking step to oxidize the second metal compound deposited from each soaking.

19. A process according to claim 15, wherein the second metal catalyst is reduced to an active metal at the same time the precious metal deposited on the exterior surface of the carrier is reduced to an active metal.

20. A process according to claim 19, wherein the precious metal is deposited on the exterior surface of the carrier before the second metal catalyst is deposited uniformly throughout the carrier.

21. A process according to claim 20, wherein the precious metal deposited on the exterior surface is oxidized before the second metal catalyst is deposited.

22. A process according to claim 15, wherein the precious metal is deposited on the exterior surface of the carrier after the second metal catalyst is deposited uniformly throughout the carrier and reduced to an active pure metal.

23. A process according to claim 15, wherein the second metal catalyst is selected from the group consisting of cobalt, molybdenum and ruthenium.

24. A process according to claim 23, wherein iridium is deposited on the exterior surface of the catalyst and ruthenium is deposited uniformly throughout the carrier.

25. The process of claim 24, wherein from about $\frac{1}{2}$ to 4% by weight of iridium is deposited on the exterior surface of the catalyst and from about 4 to 8% by weight of ruthenium is deposited uniformly throughout the catalyst.

* * * * *

UNITED STATES PATENT AND TRADEMARK OFFICE
CERTIFICATE OF CORRECTION

PATENT NO. : 4,324,819
DATED : April 13, 1982
INVENTOR(S) : Philip J. Birbara

It is certified that error appears in the above—identified patent and that said Letters Patent is hereby corrected as shown below:

On the title page item [73] assignee should be changed from:

"United Aircraft Corporation" to --United Technologies Corporation--.

Sheet 1 of the drawings consisting of Figures 1-4 consisting of Figures 1-4 as shown on the attached sheet should be added.

On the title page, "no drawings" should read --4 drawing figures--.

Column 15, line 9, "of" should read -- to --.

Signed and Sealed this

Sixteenth Day of November 1982

[SEAL]

Attest:

Attesting Officer

GERALD J. MOSSINGHOFF
Commissioner of Patents and Trademarks

INVENTOR

PHILIP J. BIRBARA

Finnegan, Henderson & Faralco